US010368629B2

(12) United States Patent
Valentine

(10) Patent No.: US 10,368,629 B2
(45) Date of Patent: Aug. 6, 2019

(54) USER CUFF FOR SECURING INTERCHANGEABLE DECORATIVE ACCESSORIES

(71) Applicant: Diann Valentine, Studio City, CA (US)

(72) Inventor: Diann Valentine, Studio City, CA (US)

(*) Notice: Subject to any disclaimer, the term of this patent is extended or adjusted under 35 U.S.C. 154(b) by 129 days.

(21) Appl. No.: 15/291,966

(22) Filed: Oct. 12, 2016

(65) Prior Publication Data

US 2017/0099935 A1 Apr. 13, 2017

Related U.S. Application Data

(60) Provisional application No. 62/240,432, filed on Oct. 12, 2015.

(51) Int. Cl.
*A45F 5/08* (2006.01)
*A01G 5/04* (2006.01)
*A44C 5/00* (2006.01)
*A45F 5/00* (2006.01)

(52) U.S. Cl.
CPC .................. *A45F 5/08* (2013.01); *A01G 5/04* (2013.01); *A44C 5/00* (2013.01); *A45F 2005/008* (2013.01)

(58) Field of Classification Search
CPC ....... A45F 5/08; A45F 2005/008; A01G 5/04; A44C 5/00; A41D 20/00; A41D 13/088; A41D 19/0044; A41D 19/0048; A41D 19/0051
USPC ........................................................... 2/170
See application file for complete search history.

(56) References Cited

U.S. PATENT DOCUMENTS

| 412,833 | A | * | 10/1889 | Brunka | A45F 5/08 24/6 |
|---|---|---|---|---|---|
| 471,181 | A | * | 3/1892 | Laun | A45F 5/08 24/6 |
| 1,965,152 | A | * | 7/1934 | Murray | A45F 5/08 24/505 |
| 2,242,975 | A | * | 5/1941 | Kaber | A45F 5/08 224/219 |
| D158,661 | S | * | 5/1950 | Harris | D11/4 |
| 3,056,969 | A | * | 10/1962 | Speros | A42B 1/004 2/171 |
| 3,148,480 | A | * | 9/1964 | Gallo | A01G 5/04 47/41.12 |
| 3,368,303 | A |   | 2/1968 | Tong |   |

(Continued)

OTHER PUBLICATIONS

"Valentine Cuff Trunk Show" (lfreakinstudios); Jul. 1, 2015: https://youtu.be/ft5Aq8Aq4ss.

*Primary Examiner* — Victor D Batson
*Assistant Examiner* — Matthew J Sullivan
(74) *Attorney, Agent, or Firm* — Plager Schack LLP

(57) ABSTRACT

A decorative cuff secured to a wrist region of a user is designed to secure a bouquet and a plurality of interchangeable accessories thereon. The decorative cuff includes a circular band member detachably coupled to the wrist region of the user and having a cutout, a plurality of loop members coupled to an edge of the cutout in the circular band member, each loop member in the plurality of loop members able to secure one of the plurality of interchangeable accessories, a disk coupled to the circular band, and a foam block coupled to the disk and able to permit stems of the bouquet to extend therethrough, thereby securing the bouquet to the decorative cuff.

6 Claims, 4 Drawing Sheets

(56) References Cited

U.S. PATENT DOCUMENTS

| | | | | |
|---|---|---|---|---|
| 3,949,568 | A | * | 4/1976 | Gallagher ............ A44C 9/0061 24/5 |
| 5,733,612 | A | * | 3/1998 | Garry ........................ A01G 5/04 156/63 |
| 5,789,043 | A | * | 8/1998 | Law ........................ G09F 19/08 156/63 |
| 7,168,601 | B2 | * | 1/2007 | Goodhue .................. A45F 5/00 206/347 |
| 2005/0011116 | A1 | | 1/2005 | Miller |

* cited by examiner

USER CUFF FOR SECURING INTERCHANGEABLE DECORATIVE ACCESSORIES

RELATED APPLICATION

The application claims priority to provisional patent application U.S. Ser. No. 62/240,432 filed on Oct. 12, 2015, the entire contents of which is herein incorporated by reference.

BACKGROUND

The embodiments herein relate generally to decorative accessories designed to be worn or carried by individuals.

Decorative items and/or accessories are commonly used by individuals during special occasions such as weddings, high school proms, other formal and special occasions, and the like. In particular, it is a common practice for brides to carry bridal bouquets during these ceremonies. However, these bridal bouquets cover up the most intricate details of wedding gowns worn by brides, thereby impeding everyone's view of the gowns. In addition, traditional bridal bouquets are undesirable because they are heavy and cumbersome to carry.

As such, there is a need in the industry for a hands-free and light weight cuff that addresses the limitations of the prior art, which can secure a bouquet and different types of interchangeable decorative accessories thereon.

SUMMARY

A decorative cuff configured to be secured to a wrist region of a user is provided. The decorative cuff is configured to secure a bouquet and a plurality of interchangeable accessories thereon. The decorative cuff comprises a circular band member detachably coupled to the wrist region of the user, the circular band comprising a cutout sufficiently large to permit the wrist region of the user to pass therethrough, a plurality of loop members coupled to an edge of the cutout in the circular band member, each loop member in the plurality of loop members configured to secure one of the plurality of interchangeable accessories, a disk coupled to the circular band, and a foam block coupled to the disk and configured to permit stems of the bouquet to extend therethrough, thereby securing the bouquet to the decorative cuff.

In certain embodiments of the invention, a first set of fasteners and a second set of fasteners are both coupled to the disk and foam block. Each fastener in the first and second sets of fasteners comprises a circular base, a stem coupled to the circular base, and a plurality of slanted prongs coupled to the stem.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
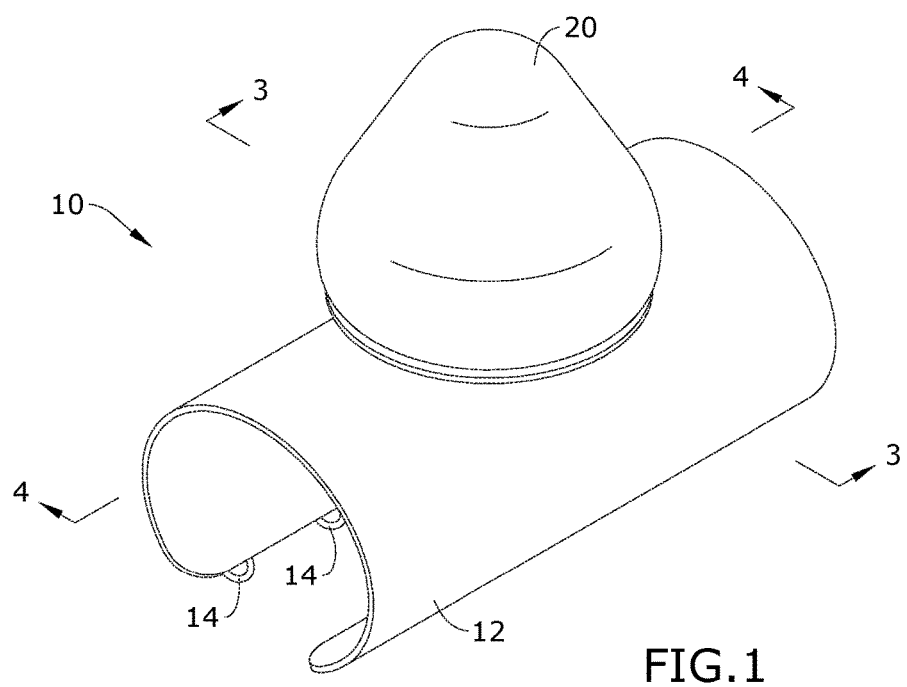
FIG. 1 depicts a perspective view of certain embodiments of the decorative cuff.
Figure 2:
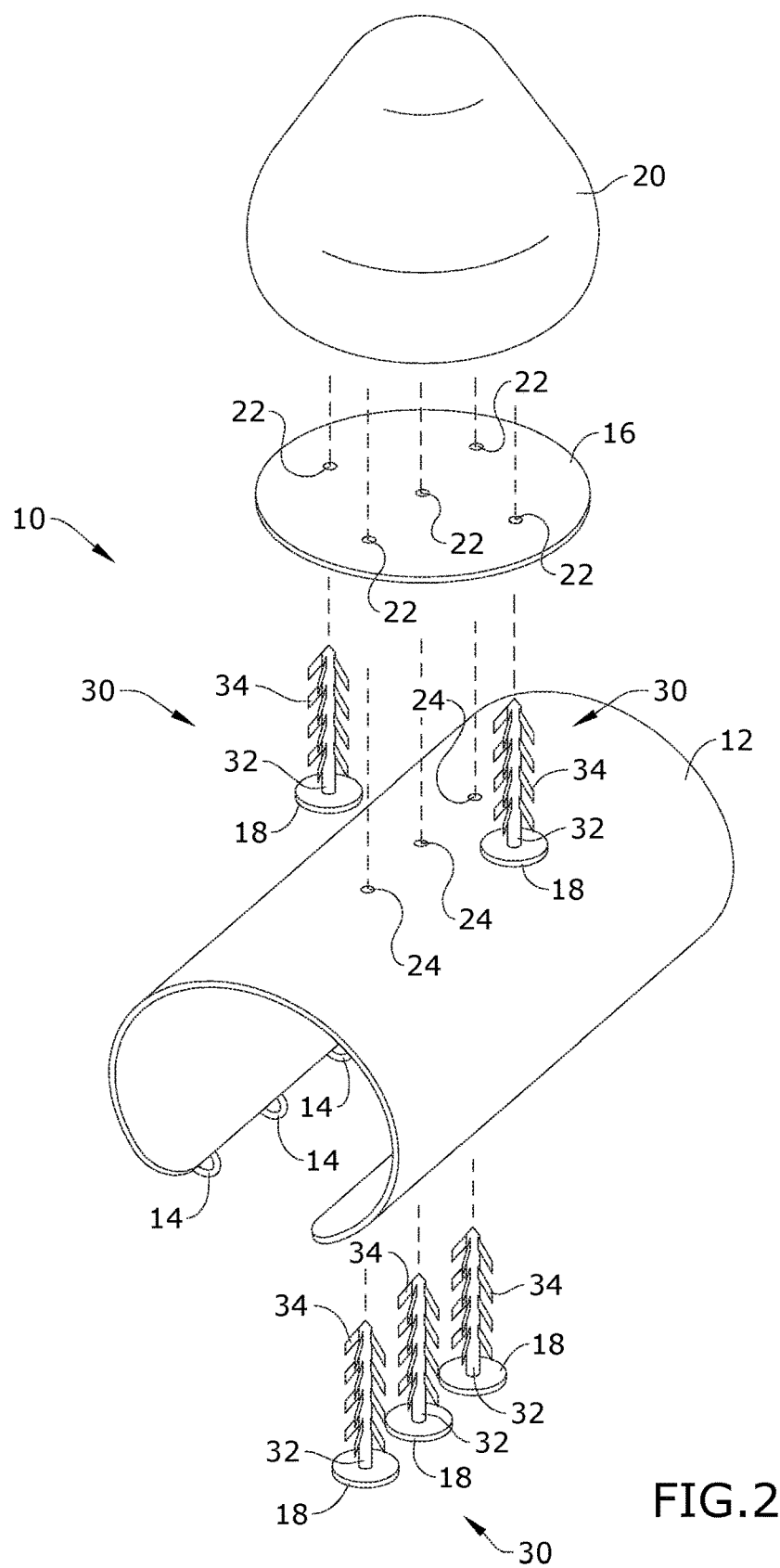
FIG. 2 depicts an exploded view of certain embodiments of the decorative cuff.

As depicted in FIGS. 1-2, decorative cuff 10 is designed to be worn on a wrist of a user and is configured to secure a bouquet and a plurality of interchangeable accessories (not shown) thereon. In certain embodiments of the invention, decorative cuff 10 generally comprises circular band 12, disk 16 and foam block 20.

Circular band 12 comprises a cutout and is made from rhodium, brass or other bendable metal. The dimensions of circular band 12 may vary. However, in a preferred embodiment, the width of circular band 12 is approximately 2"-6". The top portion of circular band 12 comprises holes 24 and the cutout is sufficiently large to permit the user's wrist to pass through. This allows circular band 12 to easily slip on and off the user's wrist. A plurality of loop members 14 is coupled to an edge of the cutout of circular band 12. In one embodiment, loop members 14 are evenly spaced throughout the edge of the cutout. Each loop member 14 is configured to secure an accessory (not shown), which may include, but is not limited to, beads, pearls, chains, other decorative garlands, or the like. In an alternative embodiment, other fasteners can be used instead of loops such as clips, hook fasteners, snap fasteners, or the like.

Disk 16 and foam block 20 are coupled to the top of circular band 12 by fasteners 30. Disk 16 comprises a circular member that provides a flat surface to support foam block 20. Disk 16 may be made from a variety of materials such as rhodium, brass, other metals or other materials. Disk 16 comprises a plurality of holes 22 disposed therethrough. Each hole 22 is configured to receive fastener 30. Each fastener 30 is preferably made from plastic and comprises circular base 18, stem 32 and slanted prongs 34. Stem 32 is coupled to circular base 18. Slanted prongs 34 are coupled to stem 32. In a preferred embodiment, each fastener 30 comprises a height of approximately 1" and a diameter of circular base 18 of approximately 7/16".

Foam block 20 is a floral foam member such as OASIS foam that is configured to soak up water and receive stems of a bouquet (not shown). Foam block 20 prolongs the life of the bouquet by providing water to the stems and serves as a support member to hold the bouquet in place. In a preferred embodiment, foam block 20 comprises a circular dome shape to better fit disk 16. The bottom diameter of foam block 20 is approximately 1⅞". However, foam block 20 may have variable dimensions.

Figure 3:
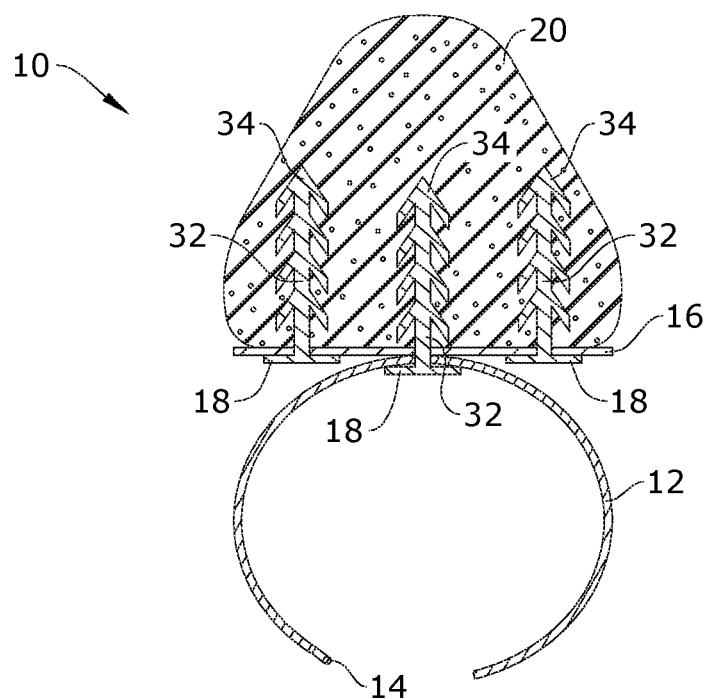
FIG. 3 depicts a section view of certain embodiments of the decorative cuff taken along line 3-3 in FIG. 1.
Figure 4:
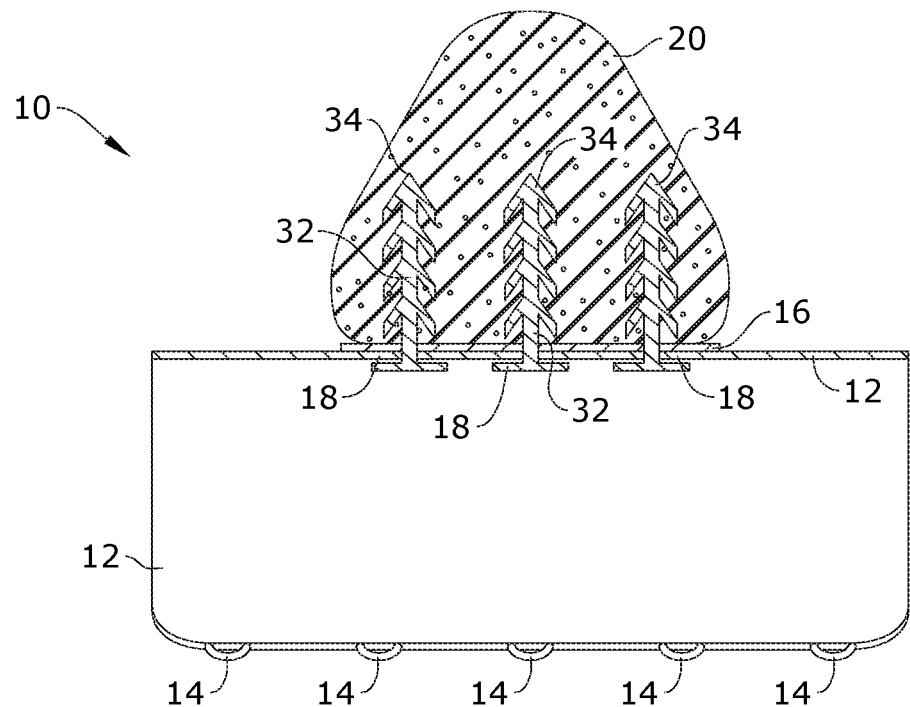
FIG. 4 depicts a section view of certain embodiments of the decorative cuff taken along line 4-4 in FIG. 1.

As depicted in FIGS. 2-4, a first set of fasteners 30 is coupled to disk 16 and foam block 20. More specifically, circular base 18 of each fastener 30 in the first set is coupled to the interior of circular band 12 by a fastening component such as an adhesive. Stem 32 of each fastener 30 in the first set extends through hole 24 in circular band 12, hole 22 in disk 16 and foam block 20. This permits slanted prongs 34 of each fastener 30 to extend within foam block 20.

A second set of fasteners 30 is coupled to disk 16 and foam block 20. More specifically, circular base 18 of each fastener 30 in the second set is coupled to disk 16 by a fastening component such as an adhesive. Stem 32 of each fastener 30 in the second set extends through hole 22 in disk 16 and foam block 20. This permits slanted prongs 34 of each fastener 30 to extend within foam block 20.

In a preferred embodiment, the first set comprises three fasteners 30 and the second set comprises a pair of fasteners

30. However, the number of fasteners in each set may vary. It shall be appreciated that fasteners 30 enhance the securement of foam block 20 to disk 16 and the overall stability of decorative cuff 10.

In operation, any number of flowers such as a bouquet are secured to decorative cuff 10 by inserting the stem(s) into foam block 20. Any variety of interchangeable accessories such as beads, pearls, chains, other decorative garlands, or the like, are secured to loop members 14 on circular band 12. Circular band 12 is disposed around the wrist region of the user (not shown) and worn as desired. The user can easily remove and/or replace the bouquet or interchangeable accessories as needed.

Figure 5:
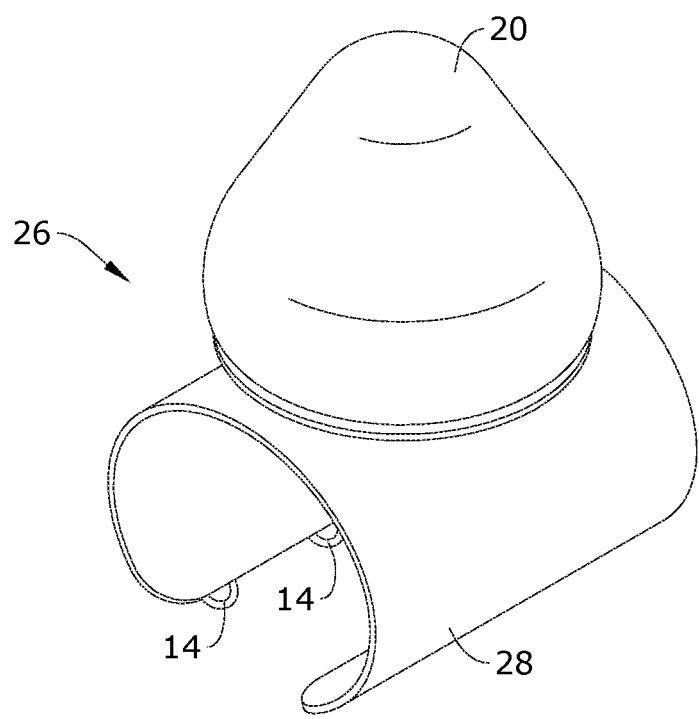
FIG. 5 depicts a perspective view of an alternative embodiment of the decorative cuff.

FIG. 5 depicts alternate decorative cuff 26, which comprises components substantially similar to decorative cuff 10. Alternate decorative cuff 26 comprises alternate circular band 28, which comprises a width that is smaller than the width of circular band 12 of decorative cuff 10.

It shall be appreciated that the components of the decorative cuffs described in several embodiments herein may comprise any alternative known materials in the field and be of any color, size and/or dimensions. It shall be appreciated that the components of the decorative cuffs described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A decorative cuff configured to be secured to a wrist region of a user, the decorative cuff configured to secure a bouquet and a plurality of interchangeable accessories thereon, the decorative cuff comprising:
    a circular band member detachably coupled to the wrist region of the user, the circular band comprising a cutout sufficiently large to permit the wrist region of the user to pass therethrough;
    a plurality of loop members coupled to an edge of the cutout in the circular band member, each loop member in the plurality of loop members configured to secure one of the plurality of interchangeable accessories;
    a disk coupled to the circular band;
    a foam block coupled to the disk and configured to permit stems of the bouquet to extend therethrough, thereby securing the bouquet to the decorative cuff; and
    a set of fasteners coupled to the disk and foam block, each fastener in the set of fasteners comprising a circular base, a stem coupled to the circular base, and a plurality of slanted prongs coupled to the stem, wherein each fastener in the set of fasteners is positioned such that the stem extends through the disk and foam block, thereby permitting the slanted prongs of each fastener in the set to extend within the foam block.

2. The decorative cuff of claim 1, wherein the plurality of loop members are evenly spaced throughout the edge of the cutout in the circular band.

3. The decorative cuff of claim 2, further comprising another set of fasteners coupled to the disk and foam block, each fastener in the another set of fasteners comprising a circular base, a stem coupled to the circular base, and a plurality of slanted prongs coupled to the stem, wherein each fastener in the another set of fasteners is positioned such that the stem extends through the circular band member, disk and foam block, thereby permitting the slanted prongs of each fastener in the another set to extend within the foam block.

4. The decorative cuff of claim 3, wherein the circular base of each fastener in the another set of fasteners is coupled to the circular band member.

5. The decorative cuff of claim 4, wherein the circular base of each fastener in the set of fasteners is coupled to the disk.

6. The decorative cuff of claim 5, wherein the foam block comprises a circular dome shape.

\* \* \* \* \*